United States Patent [19]
Bronicki et al.

[11] Patent Number: 5,970,714
[45] Date of Patent: Oct. 26, 1999

[54] GEOTHERMAL POWER PLANT OPERATING ON HIGH PRESSURE GEOTHERMAL FLUID

[75] Inventors: Lucien Y. Bronicki, Yavne; Nadav Amir, Rehovot; Yoel Gilon, Jerusalem, all of Israel

[73] Assignee: Ormat Industries Ltd., Yavne, Israel

[21] Appl. No.: 08/689,846

[22] Filed: Aug. 14, 1996

Related U.S. Application Data

[63] Continuation of application No. 08/261,048, Jun. 14, 1994, abandoned, which is a continuation of application No. 07/955,454, Oct. 2, 1992, abandoned.

[51] Int. Cl.$^6$ ..................................................... F03G 7/00
[52] U.S. Cl. .......................... 60/641.3; 60/641.5; 60/655
[58] Field of Search .......................... 60/641.2, 641.3, 60/641.5, 655, 676

[56] References Cited

U.S. PATENT DOCUMENTS

| | | | |
|---|---|---|---|
| 3,413,805 | 12/1968 | Heller et al. | 60/655 |
| 3,937,024 | 2/1976 | Durrant et al. | 60/676 |
| 4,120,158 | 10/1978 | Sheinbaum | 60/641.3 X |
| 4,357,802 | 11/1982 | Wahl, III et al. | 60/641.2 X |
| 4,512,851 | 4/1985 | Swearingen | 60/641.5 X |
| 4,542,625 | 9/1985 | Bronicki | 60/655 X |
| 5,038,567 | 8/1991 | Mortiz | 60/676 X |

FOREIGN PATENT DOCUMENTS

| | | | |
|---|---|---|---|
| 0372864 | 6/1990 | European Pat. Off. . | |
| 0091385 | 6/1982 | Japan | 60/641.2 |
| 0183579 | 11/1982 | Japan | 60/641.2 |
| 0098178 | 6/1985 | Japan | 60/641.2 |

OTHER PUBLICATIONS

New Zealand Office Action Aug. 1994.
U.S. application N. 08/099,337 Rigal, filed on Aug. 2, 1993.

*Primary Examiner*—Hoang Nguyen
*Attorney, Agent, or Firm*—Donald M. Sandler

[57] ABSTRACT

A geothermal power plant operating on high pressure geothermal fluid includes a primary separator for separating the geothermal fluid into two channels, one containing high pressure steam and the other containing high pressure liquid. A primary steam turbine in the high pressure steam channel is responsive to high pressure steam for generating electricity and producing heat depleted high pressure steam. A secondary separator separates the heat depleted high pressure steam into a steam component and a liquid component. A primary heat exchanger is responsive to the high pressure liquid and the steam component for transferring heat to said steam component thereby producing low pressure steam and cooled high pressure liquid. At least one power plant module includes a low pressure steam turbine responsive to the low pressure steam for producing electricity and heat depleted low pressure steam; a condenser/vaporizer containing an organic fluid for receiving the heat depleted low pressure steam and converting it into condensate, and for vaporizing the organic fluid; an organic vapor turbine responsive to vaporized organic fluid produced by the condenser/vaporizer for generating electricity and for producing heat depleted organic fluid; a condenser for condensing the heat depleted organic vapor into a liquid; a preheater for heating the liquid; a pump for returning heated liquid from the preheater to the condenser/vaporizer; and a conduit for directing condensate from the condenser to the preheater.

26 Claims, 3 Drawing Sheets

5,970,714

GEOTHERMAL POWER PLANT OPERATING ON HIGH PRESSURE GEOTHERMAL FLUID

This application is a continuation of application Ser. No. 08/261,048, filed Jun. 14, 1994, which is a con of Ser. No. 07/955,454 Oct. 2, 1992, abandoned.

1. TECHNICAL FIELD

This invention relates to a geothermal power plant operating on high pressure geothermal fluid.

2. BACKGROUND OF THE INVENTION

Many geothermal sources currently under investigation or exploitation produce large quantities of hot brine at moderate pressures, typically about 150 psia. Some sources, however, produce fluid mixtures of steam and brine at much higher pressures, for example, 800 psia. In the latter case, the brine is usually very corrosive giving rise to problems in using and disposing of the brine. Recently, geothermal wells in Hawaii have been drilled producing high pressure fluid that is about 80% steam and 20% brine. The steam is usually only saturated, and there is some question as to whether these wells will maintain the 800 psia pressure in the face of continuous use over the years.

To take this uncertainty to account, it has been conventional to install pressure reducing valves into the flow from the well so that a low pressure steam system can be used in the expectation that the high pressure eventually will fall. However, this is a conservative design, and it is costly because over the life of the plant, because a considerable amount of potential power will have been lost.

A back pressure steam turbine driving a generator would seem to be an alternative approach in that the high pressure steam from the well could be converted to lower pressure steam by the turbine and applied in parallel to a plurality of modules that can operate on low pressure steam. Each module may utilize a low pressure steam turbo-generator, and a condenser that acts as a vaporizer for an organic vapor turbo-generator. When the geothermal fluid produces only high pressure, saturated steam, expansion of the steam in a turbine takes place in the wet region of the temperature-entropy diagram, producing exhaust steam that contains water droplets and is thus not suitable for application to the inlet stages of low pressure steam turbines in the various modules.

It is therefore an object of the present invention to provide a new and improved geothermal power plant capable of operating on high pressure geothermal fluid without the attendant disadvantages of the prior art described above.

BRIEF DESCRIPTION OF THE INVENTION

According to the present invention a geothermal power plant operating with high pressure geothermal fluid includes a primary separator for separating the geothermal fluid into two channels, one containing high pressure steam and the other containing high pressure liquid. The high pressure steam is expanded in a primary turbine for generating electricity and producing heat-depleted high pressure exhaust steam that contains a considerable amount of moisture. The heat-depleted high pressure steam is applied to as secondary separator which separates the exhaust steam into a steam component and a liquid component. The high pressure liquid produced by the primary separator is applied to a primary heat exchanger to which the steam component from the secondary separator is also applied for the purpose of transferring heat to the steam component. The primary heat exchanger serves to dry, and possibly superheat, the steam component producing low pressure, dry saturated, or possibly superheated steam; and the cooled high pressure liquid is disposed of.

At least one power plant module is provided including a low pressure steam turbine responsive to the low pressure steam for producing electricity and heat-depleted low pressure steam which is supplied to a condenser/vaporizer that contains an organic fluid. In the condenser/vaporizer, the heat depleted low pressure steam is condensed into condensate as the organic fluid is vaporized. The vaporized organic fluid is applied to an organic vapor turbine which generates electricity and produces heat depleted organic vapor. A condenser condenses the heat depleted organic vapor into a liquid which is pumped back into the condenser/vaporizer through a preheater. Condensate from the organic vapor condenser is directed into the preheater where the condensate is cooled and then disposed of in a rejection well.

Although the high pressure liquid produced by the primary separator will usually be very corrosive and unusable for most purposes, it can be used in a primary heat exchanger for the purpose of drying, and possibly superheating the steam component produced by the second separator for use by the steam turbines of the modules. Furthermore, the condensate produced by the condenser/vaporizer of a module contains a considerable amount of heat that, instead of being passed directly to a rejection well, can be used for preheating.

When a plurality modules of the type described are utilized, the low pressure steam is applied in parallel to the steam turbines of each of the modules. In this case, the condensate from the secondary separator, which has a temperature corresponding to the exhaust temperature of the high pressure steam turbine is also available for preheating purpose, and consequently, the liquid component produced by the second separator is applied in parallel to each preheater of the various modules.

BRIEF DESCRIPTION OF THE DRAWINGS

Embodiments of the present invention are shown by way of example in the accompanying drawings wherein.

DETAILED DESCRIPTION

Figure 1:
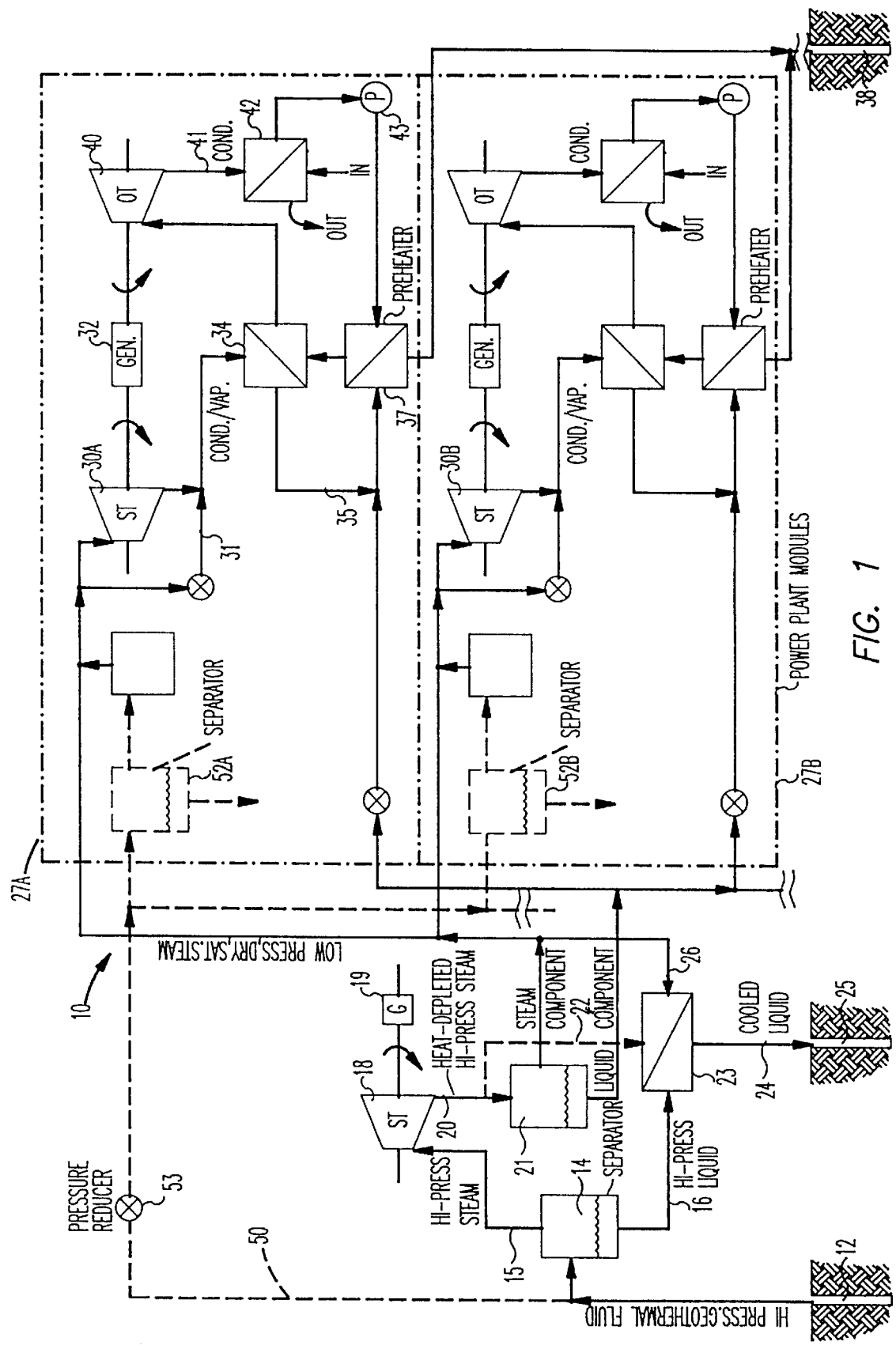
FIG. 1 is a block diagram of a geothermal power plant according to the present invention for operating with high pressure geothermal fluid.

Referring now to the drawing, reference numeral 10 designates a geothermal power plant according to the present invention operating on high pressure geothermal fluid. The geothermal fluid is supplied from production well 12 and typically produces geothermal fluid at about 800 psia, the fluid being a mixture of about 80% saturated steam and 20% concentrated brine. The composite fluid produced by well 12 is supplied to primary separator 14 which separates the fluid into two channels, a channel containing steam indicated by reference numeral 15 and a channel containing high pressure liquid indicated by reference numeral 16. The high pressure saturated steam in channel 15 is applied to high pressure steam turbine 18 which is directly coupled to generator 19 such that the expansion of the high pressure steam in turbine 18 drives generator 19 which produces electricity supplied to an electrical grid (not shown).

High pressure heat depleted steam is exhausted from turbine 18 at 20 and can be supplied to secondary separator 21 for separating the exhaust into a steam component and a liquid component. In such case, the steam component is directed in parallel, to each of a plurality of power plant modules indicated by reference numerals 27A, 27B, etc. Alternatively, the high pressure, heat depleted steam exhausted from turbine 18 through line 20 is directed through conduit 22 into primary heat exchanger 23 to which high pressure liquid in line 16 is also applied. A heat exchange process takes place within primary heat exchanger 23 wherein the high pressure liquid, which is at the well head temperature and pressure, is cooled and then delivered via conduit 24 to rejection well 25. The heat contained in the high pressure liquid is transferred to the steam component in line 22 thereby superheating the steam component and producing low pressure dry steam which is supplied by the conduit 26 in parallel to each of a plurality of power plant modules indicated by reference numerals 27A, 27B, etc.

Low pressure, dry saturated steam, or superheated steam, in line 26 is applied to the inlet stage of steam turbines 30A, 30B, etc. of the power plant modules 27A, 27B, etc. Only two modules are shown in FIG. 1, although in actual practice, it is contemplated that ten or more modules would actually be used. To facilitate a description of the present invention, details of only module 27A will be described.

Low pressure steam applied to the inlet of steam turbine 30A expands in the turbine producing heat depleted low pressure steam as some of the energy in the steam is converted to electricity by reason of the coupling between steam turbine 30A and generator 32. The heat depleted low pressure steam exhausted from turbine 30A is applied to condenser/vaporizer 34 where condensation of heat depleted steam takes producing condensate in line 35. This condensate, preferably together with a portion of the liquid component produced by second separator 21, is applied to preheater 37 of the power plant module. After the condensate and preferably the liquid component give up heat in the preheater, the cooled liquids are combined and disposed of in rejection well 38.

Condenser/vaporizer 34 contains an organic fluid, preferably, pentane, or isopentane, according to prevailing ambient conditions, which is vaporized by the condensation of the low pressure steam on one side of the condenser. Vaporized organic fluid produced by the condenser/vaporizer is applied to organic vapor turbine 40 wherein expansion takes place producing heat depleted organic vapor in line 41 as organic turbine 40 drive generator 32.

Condenser 42 receives the heat depleted organic vapor exhausted from turbine 40 and the presence of a coolant in the condenser 42 condenses the heat depleted organic vapor to a liquid which is pumped by pump 43 back into the condenser/vaporizer through preheater 37 wherein the organic liquid is preheated before being supplied to condenser vaporizer 34. The coolant for condenser 42 may be air or may be liquid such as water.

Finally, bypass line 31 associated with steam turbine 30A in module 27A is provided for permitting the steam turbine to be taken out of service for maintenance without seriously affecting the operation of organic vapor turbine 40 of the module.

FIG. 1 shows two rejection wells, namely well 25 and well 38. However, it is possible to utilize a single rejection well and this is particularly desirable where the cooled liquid in line 24 of the power plant is such that precipitation may take place during the cooling process. In such case, the almost pure water produced by the preheaters 37 of the power plant modules can be combined with the cooled liquid in line 24 in order to dilute the brine and thus inhibit precipitation during the transfer of the cooled liquid into the rejection well.

In order to provide flexibility in the operation of the geothermal power plant shown in FIG. 1 for both maintenance purposes and to provide for the contingency of a reduction in pressure and temperature of the geothermal source fluid produced by production well 12, turbine 18 is bypassed by bypass line 50 for the purpose of providing geothermal fluid from production well 12 directly to separators 52A, 52B of the power plant modules. To take account of the high pressure of well 12, pressure reducer 53 in line 50 is utilized. Thus, the pressure of the geothermal fluid applied to separator 52A in power plant module 27A is consistent with the operating inlet pressure for steam turbine 30A of the module.

When line 50 is operative, steam turbine 18 may be shut down and separator 14 will be inoperative. Consequently, line 26 will not carry any low pressure steam. Instead, separators 52A and 52B become active dividing the geothermal fluid into two streams much like primary separator 14 functions in connection with steam turbine 18. Thus, low pressure steam is supplied from separator 52A to steam turbine 30A.

The main portion of each module operates as described before except that, usually, only condensate produced by the condenser vaporizer is available for preheater 37. Usually, the brine component of the geothermal fluid in line 50 is so concentrated and corrosive that it may be impractical to apply this to the preheater. However, when conditions are appropriate, the brine component can be supplied to the preheater, the condensate produced by the condenser vaporizer serving to dilute the concentrated brine to prevent precipitation in the preheater.

As indicated above, the advantage of having bypass line 50 in an actual plant is the flexibility that it provides during maintenance of steam turbine 18. Thus, this turbine can be taken out of operation by opening the bypass line and permitting the power plant modules to continue operation and remain on-line. Therefore, the total power produced by the power plant is reduced by reason of taking generator 19 off-line, but the power plant is still capable of producing a considerable amount of electricity. Of course, the modular nature of the power plant permits each of the individual modules 27A, 27B, etc. to be taken off line for maintenance purposes with only a small reduction in the output of the power plant.

Figure 2:
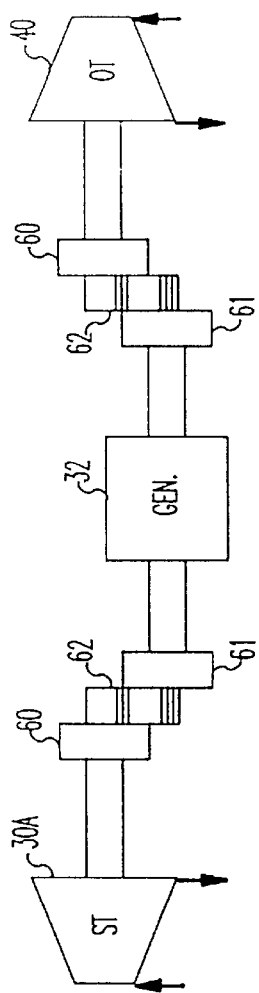
FIG. 2 is a schematic showing of the coupling means by which a single generator is connected as the output of the steam and organic vapor turbine of a module that is part of the power plant shown in FIG. 1.

The preferred form of the coupling of generator 32 to steam turbine 30A and organic turbine 40 of a module is illustrated in FIG. 2. The preferred arrangement is such that a Falk disc coupling is rigidly attached to the output shaft of each of turbines 30A and 40 as indicated by reference numeral 60. A similar type of coupling is used on the opposite output shafts of generator 32 as indicated by reference numeral 61 in FIG. 2. Between these couplings is a gear reduction unit 62 (manufactured by the Lufkin Company) for the purpose of permitting generator 32 to operate at a speed somewhat lower than the rotational speeds of the turbines.

Figure 3:
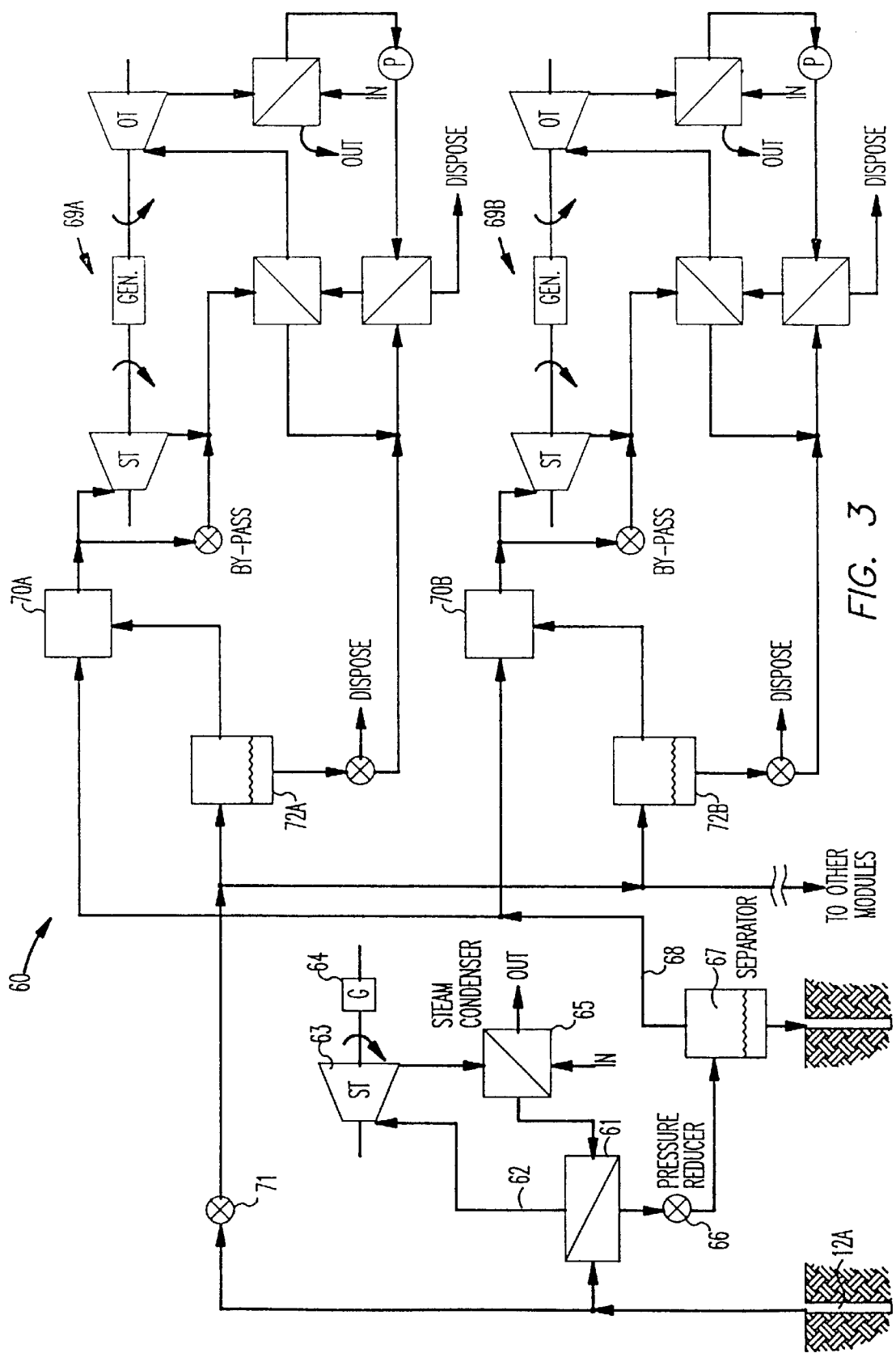
FIG. 3 is a block diagram of another embodiment of the present invention.

A modification of the embodiment of FIG. 1 is shown in FIG. 3 wherein a closed cycle, high pressure steam turbine is used in place of the open cycle steam turbine shown in FIG. 1. In power plant 60 of FIG. 3, high pressure geothermal fluid from source well 12A flows into heat exchanger 61 where heat is exchanged with water thereby producing steam in line 62 which is supplied to steam turbine 63 driving generator 64. Heat depleted steam exhausted from turbine 63 is supplied to condenser 65 where condensation takes place, the condensate being returned to heat exchanger 61 via a pump (not shown). Condenser 65 may be water or air cooled.

The geothermal fluid that exits heat exchanger 61 will be a mixture of steam and brine, but will be cooled, as compared to the brine from well 12A, but its pressure will be high. This pressure is reduced in pressure reducer 66 in much the same way pressure reducer 53 operates on source brine in the embodiment of FIG. 1. After the pressure is reduced, the fluid can flow to separator 67 where the steam portion is separated from the liquid portion. The steam will be essentially saturated and is sent via conduit 68 to the modules 69A, 69B, etc. which are similar to modules 27A, 27B, etc. previously described.

Demisters 70A, 70B, etc. in modules 69A, 69B, etc., serve to separate any moisture in the steam before the steam is applied to the steam turbines of the modules. Exhaust steam from the steam turbines in the modules is applied to a condenser/vaporizer for vaporizing an organic fluid that is supplied to an organic vapor turbine as in the previously described modules. Also, steam condensate from the condenser/vaporizer in the modules shown in FIG. 3 is also used for preheating purposes as in FIG. 1. Alternatively, the fluid exiting pressure reducer 66 can be applied directly in parallel to separators 72A and 72B.

Power plant 60 is also provided with a by-pass of turbine 63 similar to that shown in FIG. 1. That is to say, pressure-reducer 71 permits high pressure brine to selectively by-pass heat exchanger 61 for the purpose of supplying brine from source well 12A directly to the separators 72A, 72B, etc. of the modules. The separators separate the flow into a steam channel and a liquid channel, the steam channel of each module then supplying the steam turbine of the module. The liquid channel contains brine from well 12A containing a significant amount of heat which may be mixed with the condensed steam produced by the condenser/vaporizer of the modules and supplied to the preheater thereof. Thus, when turbine 63, or any of the components associated therewith, is shut down for periodic maintenance, by-pass reducer 71 will be opened to permit the modules to remain on line.

Figure 4:
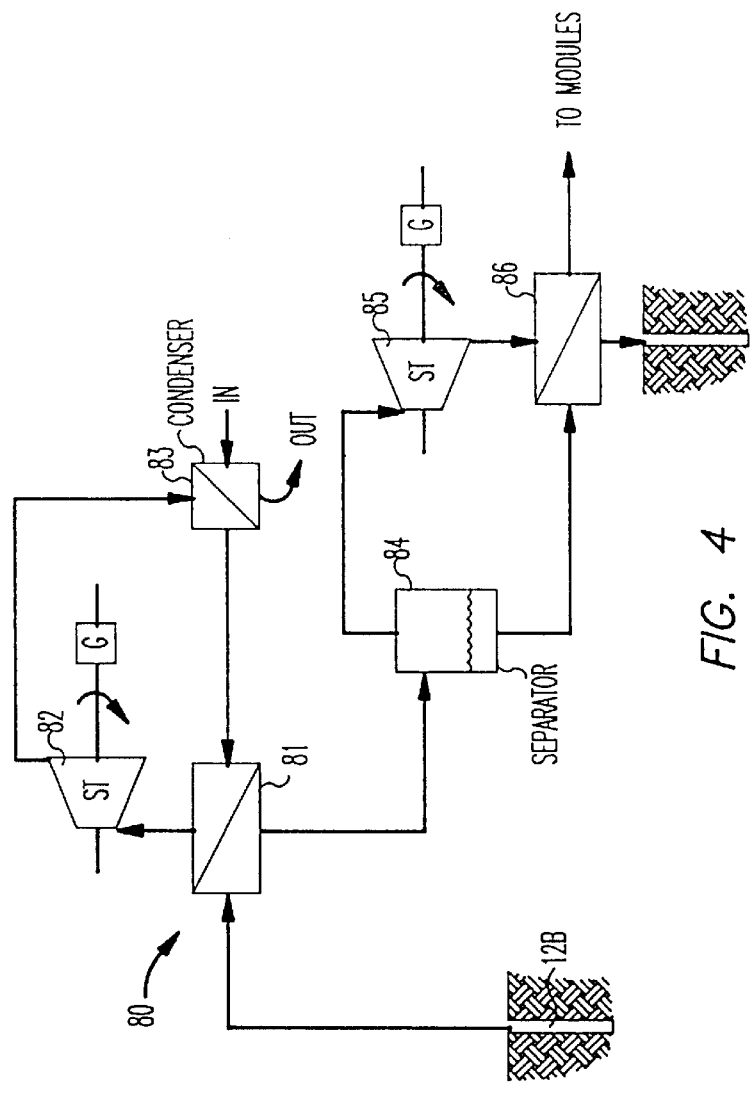
FIG. 4 is a block diagram of a portion of a further embodiment of the invention.

The further embodiment of the invention shown in FIG. 4 is a combination of the embodiments of FIGS. 1 and 3 in that a closed cycle, high pressure steam turbine is used, as in FIG. 3, and a further steam turbine is used. like in FIG. 1, in place of a pressure reducer. As shown in FIG. 4, embodiment 80 includes high pressure heat exchanger 81 that receives the high pressure brine from source well 12B. Heat in this brine is exchanged with water producing steam that is applied to high pressure steam turbine 82 driving a generator that produces electricity. The heat depleted steam produced by turbine 82 is applied to condenser 83 wherein condensation takes place, and a pump (not shown) returns the condensate to heat exchanger 81.

The cooled steam and brine mixture that exits heat exchanger 81 is applied to separator 84 which separates the mixture into a steam component and a liquid component.

The steam component is supplied to steam turbine 85 where expansion takes place driving a generator that produces electricity, and producing heat depleted steam that is supplied to heat exchanger 86. The liquid component from separator 84 is also applied to heat exchanger 86 wherein a heat exchange process takes place between the liquid component and heat depleted steam from turbine 85. The result is a drying and possibly superheating of this steam which forms a low pressure, dry saturated, or superheated steam that is supplied to the modules as shown in FIG. 1. The cooled brine from heat exchanger 86 is disposed of, preferably through a rejection well.

In this embodiment, heat depleted steam exiting turbine 82 is applied to condenser 83. If preferred, the heat depleted steam can also be applied to condenser/vaporizer 34 with the steam condensate exiting the condenser/vaporizer being applied to preheater 37 and returned to heat exchanger 81.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed:

1. A geothermal power plant operating on high pressure geothermal fluid comprising:

a) a primary separator for separating the geothermal fluid into two channels, one containing high pressure steam and the other containing high pressure liquid;

b) a primary steam turbine in the high pressure steam channel responsive to high pressure steam for generating electricity and producing heat depleted steam;

c) a secondary separator for separating said heat depleted steam into a steam component and a liquid component; and d) at least one power plant module including a low pressure steam turbine responsive to said steam component for producing electricity and heat depleted low pressure steam; a condenser/vaporizer containing an organic fluid for receiving said heat depleted low pressure steam and converting it into condensate, and for vaporizing the organic fluid; an organic vapor turbine responsive to vaporized organic fluid produced by said condenser/vaporizer for generating electricity and for producing heat depleted organic vapor; a condenser for condensing the heat depleted organic vapor into a liquid; a preheater for heating said liquid; a pump for returning heated liquid from said preheater to said condenser/vaporizer; and means for directing condensate from said condenser to said preheater.

2. A geothermal power plant according to claim 1 including means for combining the liquid component produced by said secondary separator with said condensate and applying both to said preheater.

3. A geothermal power plant according to claim 2 wherein the liquid component in said condensate that exits said preheater is disposed in an injection well.

4. A geothermal power plant according to claim 1 including a plurality of power plant modules as defined in subparagraph (d) of claim 1 wherein said steam component is supplied in parallel to each low pressure steam turbine in the plurality of power plant modules.

5. A geothermal power plant according to claim 1, wherein said module includes a module separator, and said geothermal power plant includes a bypass line having a pressure reducer and shunting said primary separator and steam turbine for applying high pressure geothermal fluid directly to said module separator which produces low pressure steam and low pressure liquid, and means for applying said low pressure steam produced by said module separator to said low pressure steam turbine of the module.

6. A geothermal power plant according to claim 5, wherein said low pressure liquid is applied to the preheater of said module.

7. A geothermal power plant according to claim 1, wherein each module includes a single electric generator interposed between the steam turbine and the organic vapor turbine, a coupling for coupling the single electric generator to the steam turbine and a coupling for coupling the single electric generator to the organic vapor turbine.

8. A power plant module for a geothermal power plant that includes a source of steam comprising:
   a) a steam turbine responsive to said steam for producing electricity and heat depleted steam;
   b) a condenser/vaporizer containing an organic fluid for condensing said heat depleted steam into condensate by transferring heat to the organic fluid thereby vaporizing the the organic fluid;
   c) an organic vapor turbine responsive to vaporized organic fluid produced by said condenser/vaporizer for generating electricity and for producing heat depleted organic vapor;
   d) an organic vapor condenser for receiving said organic vapor and producing liquid organic fluid;
   e) a pump for returning said liquid organic fluid to said condenser vaporizer; and
   f) a preheater for preheating said liquid organic fluid before it is returned to said condenser/vaporizer, said preheater being supplied with condensate from said condenser/vaporizer.

9. A power plant module according to claim 8 wherein said module includes a single electric generator interposed between said steam turbine and said organic vapor turbine, and coupling means for coupling the outputs of the turbines to the generator.

10. A geothermal power plant according to claim 8 including apparatus responsive to geothermal fluid for producing said steam.

11. A geothermal power plant according to claim 10 wherein said apparatus comprises:
   a) a primary separator for separating the geothermal fluid into two channels, one containing high pressure steam and the other containing high pressure liquid; and
   b) a primary steam turbine in the high pressure steam channel responsive to high pressure steam for generating electricity and producing heat depleted high pressure steam; and
   c) means for applying said heat depleted high pressure steam to said steam turbine.

12. A geothermal power plant according to claim 11 including a secondary separator responsive to a portion of said high pressure liquid for separating said portion onto a steam component and a liquid component, and means for applying said steam component to said low pressure steam turbine in said at least on power plant module.

13. A geothermal power plant according to claim 12 including means for supplying said liquid component to said preheater.

14. A geothermal power plant according to claim 11 wherein said apparatus comprises:
   a) a primary separator for separating the geothermal fluid into two channels, one containing high pressure steam and the other containing high pressure liquid; and
   b) a primary steam turbine in the high pressure steam channel responsive to high pressure steam for generating electricity and producing heat depleted high pressure steam;
   c) a primary heat exchanger responsive to said high pressure liquid and said heat depleted steam for transferring heat to said heat depleted steam and producing low pressure steam and cooled high pressure liquid; and
   d) means for applying said low pressure steam to said steam turbine.

15. A geothermal power plant according to claim 10 wherein said apparatus comprises:
   a) an indirect contact heat exchanger for receiving geothermal fluid and vaporizing water to primary steam and producing heat depleted geothermal fluid;
   b) a primary steam turbine responsive to said primary steam for generating electricity and producing heat depleted primary steam;
   c) a primary condenser for condensing said heat depleted primary steam to a condensate;
   d) means for returning said condensate to said indirect contact heat exchanger;
   e) a primary separator for separating said heat depleted geothermal fluid into a steam component and a liquid component; and
   f) means for applying said steam component to said steam turbine.

16. A geothermal power plant according to claim 10 wherein said apparatus comprises:
   a) an indirect contact heat exchanger for receiving geothermal fluid and vaporizing water to primary steam and producing heat depleted geothermal fluid;
   b) a primary steam turbine responsive to said primary steam for generating electricity and producing heat depleted primary steam;
   c) a primary condenser for condensing said heat depleted primary steam to a condensate;
   d) means for returning said condensate to said indirect contact heat exchanger;
   e) a primary separator for separating said heat depleted geothermal fluid into a steam component and a liquid component;
   f) a secondary steam turbine responsive to said steam component for generating electricity and producing heat depleted geothermal steam;
   g) an indirect contact heat-exchanger responsive to said liquid component for heating said heat depleted geothermal steam; and
   h) means for supplying the heated, heat depleted geothermal steam to said turbine.

17. A geothermal power plant operating on high pressure geothermal fluid comprising:
   a) a separator for separating the geothermal fluid into two channels, one containing high pressure steam and the other containing high pressure liquid;
   b) a primary steam turbine in the high pressure steam channel responsive to high pressure steam for generating electricity and producing heat depleted high pressure steam;
   c) a primary heat exchanger responsive to said high pressure liquid and said heat depleted high pressure steam for transferring heat to said heat depleted steam for producing low pressure steam and cooled high pressure liquid; and d) at least one power plant module including a low pressure steam turbine responsive to said low pressure steam for producing electricity and heat depleted low pressure steam; a condenser/vaporizer containing an organic fluid for receiving said heat depleted low pressure steam and converting it into condensate, and for vaporizing the organic fluid; an organic vapor turbine responsive to vaporized organic fluid produced by said condenser/vaporizer for generating electricity and for producing heat depleted organic vapor; a condenser for condensing the heat depleted organic vapor into a liquid; a preheater for heating said liquid; a pump for returning heated liquid from said preheater to said condenser/vaporizer; and means for directing condensate from said condenser to said preheater.

18. A geothermal power plant according to claim 17, wherein said cooled high pressure liquid is disposed of in a rejection well.

19. A geothermal power plant according to claim 17 wherein said at least one power plant module includes a single electric generator, and means coupling said single electric generator to said low pressure steam turbine and said organic vapor turbine.

20. A geothermal power plant according to claim 19 wherein said single electric generator is located between the low pressure steam turbine and said organic vapor turbine of said at least one power plant module.

21. A geothermal power plant according to claim 20 wherein said coupling means includes a gear reducer.

22. A geothermal power plant according to claim 17 including a by-pass line containing a pressure reducer element serially connected to a by-pass separator for directly connecting said low pressure steam turbine of sad at least one power plant module to said geothermal fluid and by-passing said primary steam turbine.

23. A geothermal power plant operating on geothermal fluid comprising:
    a) a separator for separating the geothermal fluid into two channels, one containing geothermal steam and the other containing geothermal liquid;
    b) a steam turbine responsive to said geothermal steam for generating electricity and producing heat depleted geothermal steam;
    c) a heat exchanger responsive to said geothermal liquid and said heat depleted steam for transferring heat to said heat depleted steam component for producing low pressure steam and cooled high pressure liquid; and
    d) means responsive to said low pressure steam for generating electricity.

24. A geothermal power plant according to claim 23 wherein said means responsive to said low pressure steam includes a low pressure steam turbine responsive to said low pressure steam for producing electricity and heat depleted low pressure steam; a condenser/vaporizer containing an organic fluid for receiving said heat depleted low pressure steam and converting it into condensate, and for vaporizing the organic fluid; an organic vapor turbine responsive to vaporized organic fluid produced by said condenser/vaporizer for generating electricity and for producing heat depleted organic fluid; a condenser for condensing the heat depleted organic vapor into a liquid; and a pump for returning said liquid to said condenser/vaporizer.

25. A geothermal power plant operating on geothermal steam comprising:
    a) a steam turbine responsive to said geothermal steam for producing electricity and heat depleted geothermal steam;
    b) a condenser/vaporizer containing an organic fluid for receiving said heat depleted geothermal steam and converting it into condensate, and for vaporizing the organic fluid;
    c) an organic vapor turbine responsive to vaporized organic fluid produced by said condenser/vaporizer for generating electricity and for producing heat depleted organic vapor;
    d) a condenser for condensing the heat depleted organic vapor into a liquid;
    e) a preheater for heating said liquid;
    f) a pump for returning heated liquid from said preheater to said condenser/vaporizer; and
    g) means for applying heat to said preheater, wherein said means for applying includes means for directing condensate from said condenser/vaporizer to said preheater.

26. A geothermal power plant according to claim 25 including means for applying said liquid component to said preheater of said at least one power plant module.

* * * * *